J. G. DILLAHA.
Velocipede.
No. 91,829.
Patented June 29, 1869.
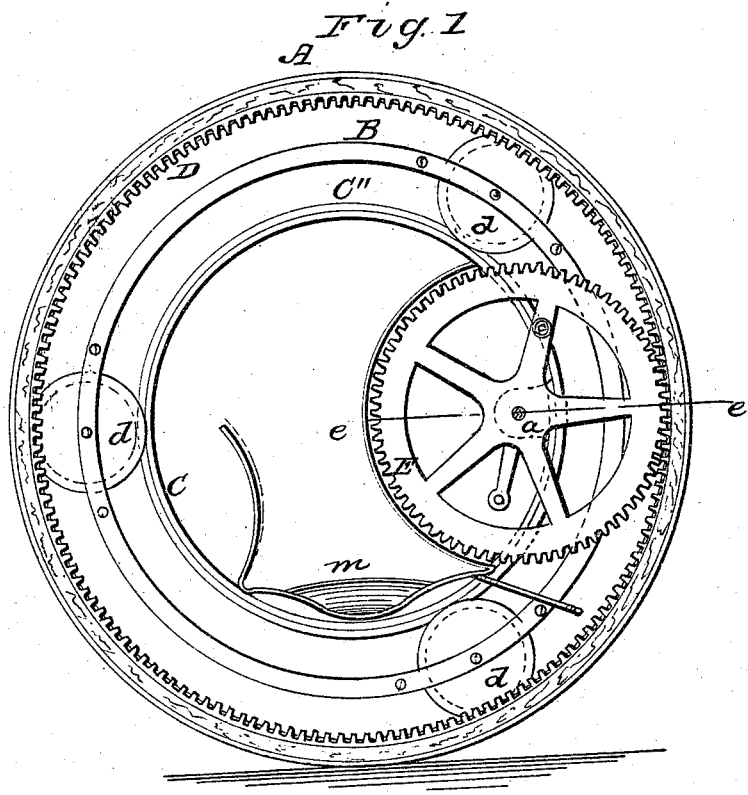
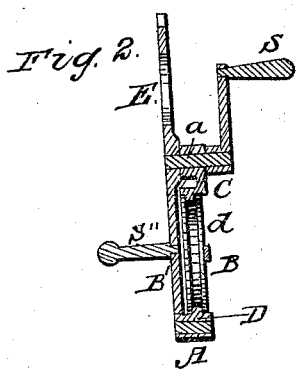
Witnesses
N. H. Sherburne
J. H. Newton
Inventor
J. G. Dillaha

United States Patent Office.

J. G. DILLAHA, OF WACO, TEXAS.

Letters Patent No. 91,829, dated June 29, 1869.

IMPROVEMENT IN VELOCIPEDES.

The Schedule referred to in these Letters Patent and making part of the same.

*To all whom it may concern:*

Be it known that I, J. G. DILLAHA, of Waco, in the county of McLennan, and State of Texas, have invented a new and useful Improvement in Velocipedes; and I do hereby declare the following to be a full, clear, and exact description thereof, reference being had to the accompanying drawings, and to the letters of reference marked thereon, making a part of this specification, in which—

Figure 1 represents a side elevation of my invention, and

Figure 2, a horizontal transverse section on line $e\ e$.

Similar letters of reference, where they occur in the separate figures, denote like parts in each of the drawings.

My invention relates to an improvement in single-wheel velocipedes; and

The nature of my improvement consists in the novel manner of its construction, as will be hereinafter more fully explained.

To enable others skilled in the art to more fully understand, construct, and use my invention, I will proceed to describe the same with reference to the drawings.

A represents the outer rim or wheel, which is from six to eight feet in diameter, and is constructed of metal, or may be of wood, as represented in the drawings.

The inner portion thereof, at one side, is provided with an internal gear, which gears with or takes into a gear-wheel, E, on crank-shaft $a$, which is held in suitable bearings attached to an inner rim, C.

Said rim is provided, around the outer side thereof, and at its centre laterally, with a projection or band, C", which forms a track, upon and around which traverse or revolve sheave-wheels $d\ d\ d$.

Said wheels extend outward, and receive or rest upon a like projection, or band D, on the inner side of wheel or rim A.

The shafts of said wheels $d\ d\ d$ are held in a third rim B B", as shown in the drawings, so constructed as to revolve alternately with wheel A.

My invention is operated as follows:

The operator is seated upon saddle $m$, which is attached to the inner side of rim C, the heft thereof causing said rim to remain stationary, or in one position, and, as power is applied to the crank, causing wheel E to rotate, which gears with or takes into wheel A, causing said wheel, together with wheels $d\ d\ d$ and rim B B" to rotate alternately around rim C, thus giving the whole a forward movement on the ground.

Having thus described the nature and operation of my invention, I disclaim the separate parts, broadly considered; but

What I do claim as new, and desire to secure by Letters Patent, is—

The combination of rim A, crank-wheel E, rims B, B", and C, and sheave-wheels $d\ d\ d$, the whole arranged to operate together, substantially in the manner and for the purpose set forth.

In testimony whereof, I have signed my name before two subscribing witnesses.

J. G. DILLAHA.

Witnesses:
 N. H. SHERBURNE,
 W. A. NEWTON.